April 22, 1969   C. J. CLEMENT   3,440,563
KINEMATIC MOUNTING STRUCTURE FOR LASER RESONATOR
Filed April 19, 1966   Sheet 2 of 4

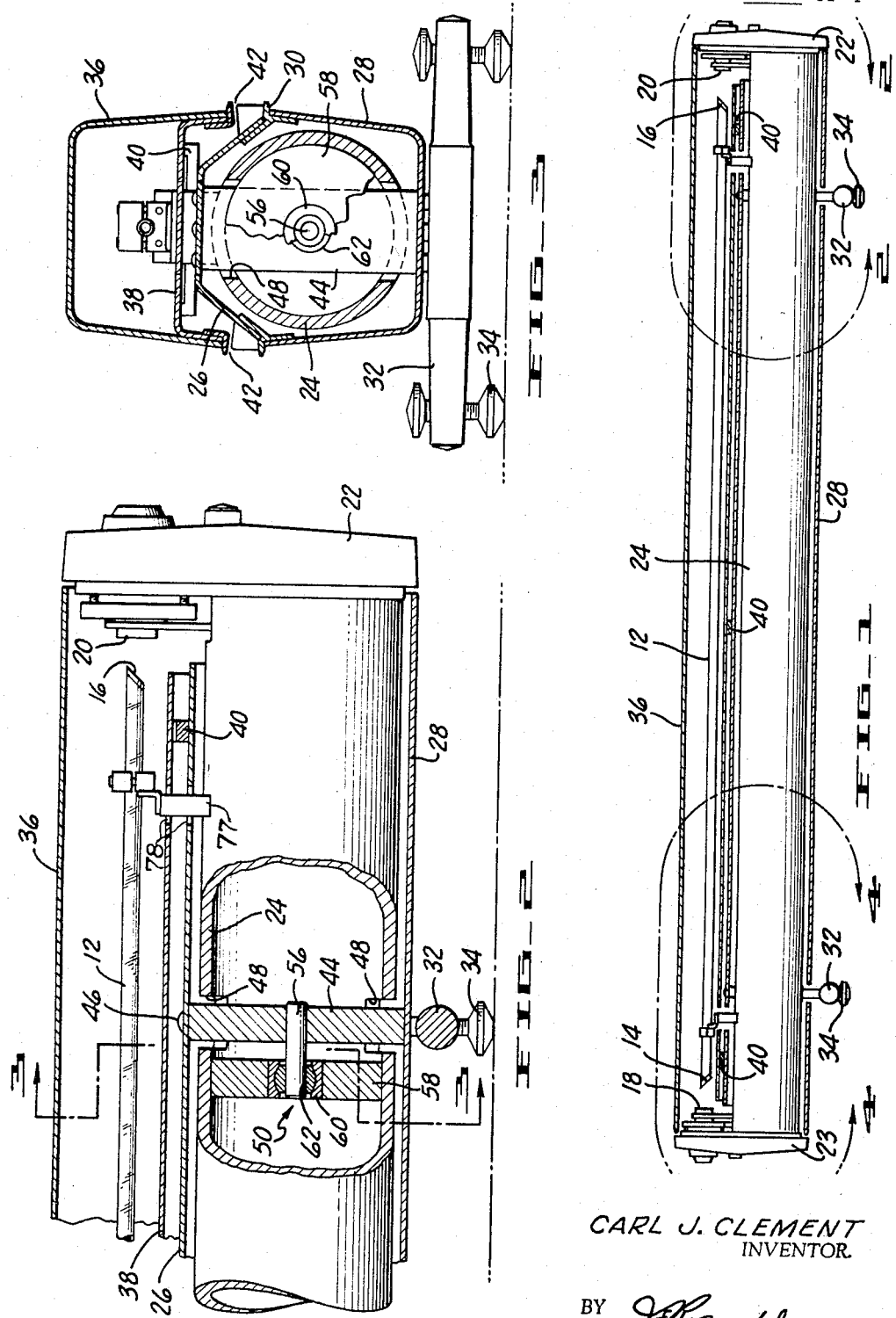

CARL J. CLEMENT
INVENTOR.

BY  *J. Rosenblum*
ATTORNEY

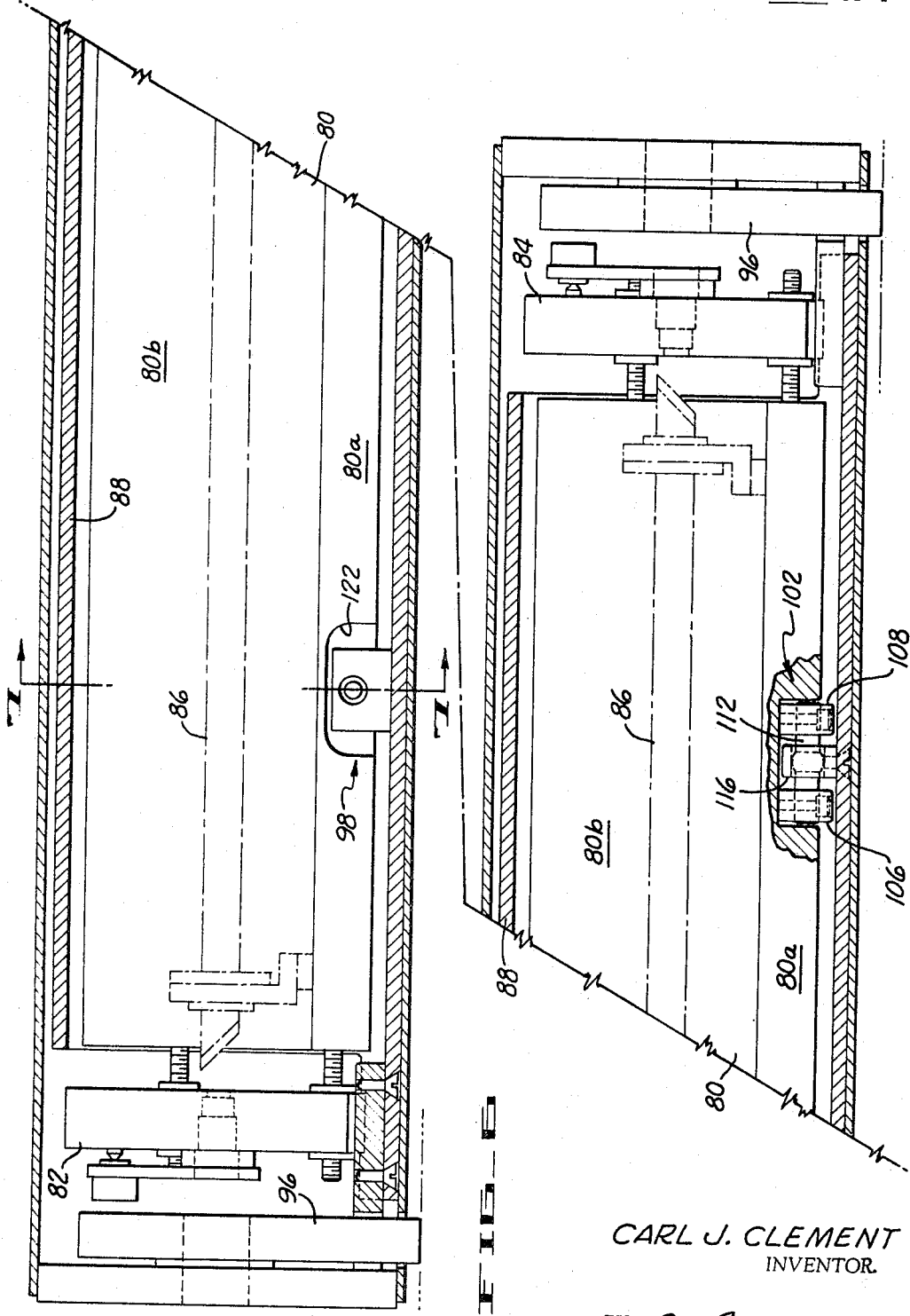

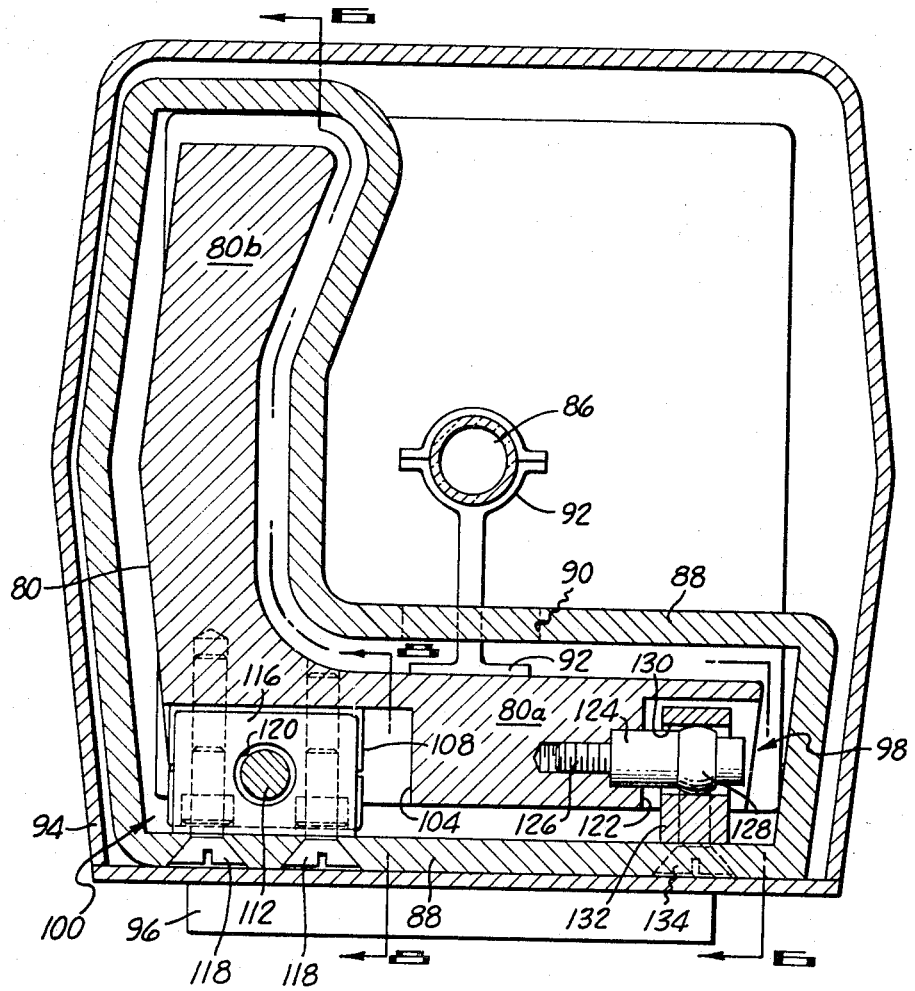
FIG_7
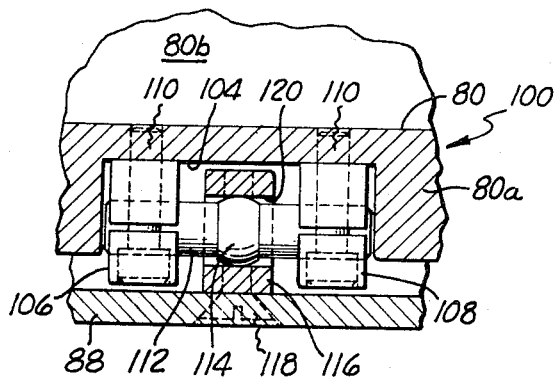
FIG_8
CARL J. CLEMENT
INVENTOR.
BY J. Rosenblum
ATTORNEY United States Patent Office 3,440,563
Patented Apr. 22, 1969

3,440,563
KINEMATIC MOUNTING STRUCTURE FOR
LASER RESONATOR
Carl J. Clement, Palo Alto, Calif., assignor to Spectra-Physics, Inc., Mountain View, Calif., a corporation of California
Filed Apr. 19, 1966, Ser. No. 543,653
Int. Cl. H01s 3/02
U.S. Cl. 331—94.5                    7 Claims This invention relates to a structure for stably supporting the optical elements of a laser resonator and more particularly to such structure that supports the optical elements in a fixed spacial relationship irrespective of stresses imposed on a structure which surrounds said supporting structure.

A laser resonator typically includes a pair of reflectors and a structure for mounting the reflectors at opposite ends of an excited active medium so that optical radiations emanating from the active medium will be resonantly reflected back into the active medium to cause oscillations at optical frequencies. Stable positioning of the reflectors is necessary for stable laser oscillation and aiming, as a consequence of which massive support structures for the reflectors are typically employed. Such massive supporting structures, when subjected to heat energy generated in exciting the active medium, experience temperature gradients thereacross which gradients cause thermal distortion of the supporting structure and consequent misalignment of the reflectors. The provision of a heat shield intermediate the active medium and the supporting structure can effectively eliminate deflections of the reflector supporting structure due to temperature gradients resulting from the transverse flow of heat through said srtucture; the present invention provides an improved mounting structure which additionally eliminates deflections of the reflector supporting structure which may be caused by a structure, such as a heat shield, which surrounds the reflector supporting structure.

Therefore, it is the principal object of this invention to provide a stable supporting structure for a laser resonator, and this object is achieved by mounting the resonator supporting structure to the surrounding structure at three spaced apart points by means of bearings, which bearings inhibit movement along two mutually perpendicular axes and which afford free movement both along a third axis mutually perpendicular to the first two axes and rotationally in all directions. Consequently, bending moments, arising, for example, from temperature gradients across a surrounding heat shield cannot be transmitted through the bearing to the resonator supporting structure.

In a laser constructed according to the present invention a heat shield is typically included in the outer housing of the device. Such outer housing whether it is supported on a horizontal surface or fixedly mounted in some other support is subject to mechanical stresses arising from such mounting. An advantageous feature of the present invention is that such stresses in the housing will not be transmitted to the resonator support structure and therefore will not adversely affect precise alignment of the resonator elements. Indeed, it is possible to stand on a laser constructed in accordance with the present invention without misaligning the reflectors sufficiently to extinguish the laser oscillation.

A further advantageous feature of the present invention is that the resonator supporting structure is statically attached to the heat shield and casing so as to afford additional mechanical stability to the supporting structure, at the same time isolating the resonator supporting structure from kinematic forces arising in the heat shield and/or casing. Consequently, the inertia inhering in the mass of the casing is added to that of the resonator supporting structure in resisting mechanical movements or oscillations, but the resonator supporting structure is not affected by movements or distortions in the heat shield and/or casing.

Yet a further advantageous feature of the present invention is that the degree of movement afforded between resonator support structure and the outer housing increases manufacturing tolerances because spherical bearings are employed to mount the resonator support structure to the outer housing. Secure mounting can thus be had without imposing stresses or moments on the support structure.

A more specific object of the present invention is to provide improved spherical bearing mounts for mechanially supporting optical resonator elements relative to a base or casing. The spherical bearings employed in the present invention are relatively simple and inexpensive and are substantially free from wear.

Other objects, features and advantages will be more apparent on referring to the following specification and accompanying drawings in which:

FIG. 1 is a side elevation view in cross section of a gas laser employing the supporting structure of the present invention;

FIG. 2 is a partial side elevation view of the right hand end of the laser of FIG. 1, portions being broken away to reveal internal details;

FIG. 3 is a transverse cross sectional view taken along line 3—3 of FIG. 2;

FIG. 6 is a side elevation view in cross section of a modied form of gas laser employing the mounting structure of the present invention;

FIG. 7 is a transverse cross section view at enlarged scale taken along line 7—7 of FIG. 6; and FIG. 8 is a partial cross-sectional view taken along line 8—8 of FIG. 7.

Figure 4:
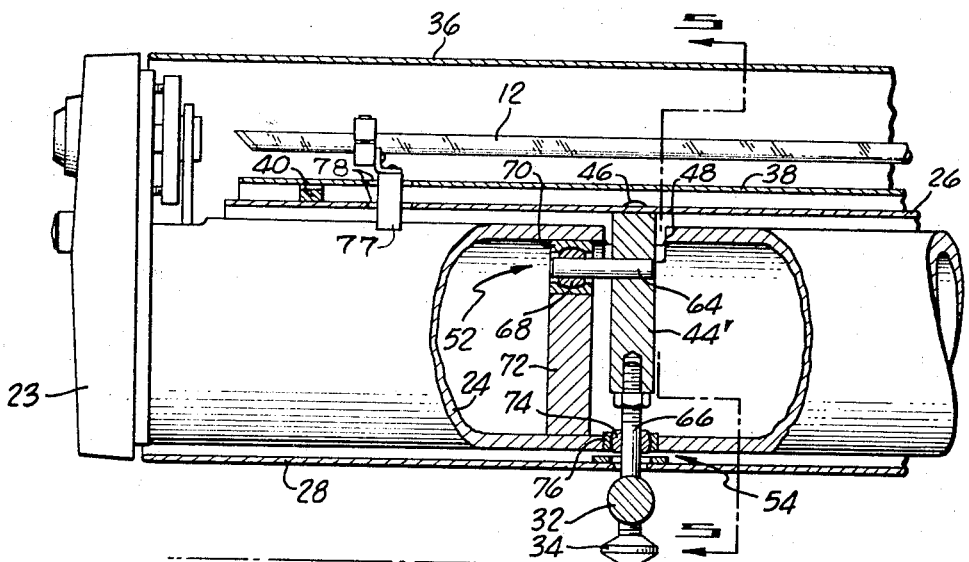
FIG. 4 is a partial side elevation view of the left hand end of the laser of FIG. 1 at enlarged scale, portions being broken away to reveal internal details.
Figure 5:
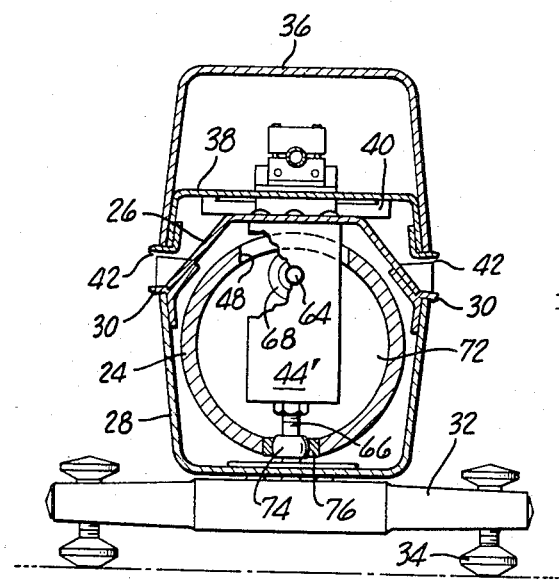
FIG. 5 is a transverse cross section view taken along line 5—5 of FIG. 4.

Referring more particularly to the drawings, reference numeral 12 indicates an active medium comprising a plasma tube that contains gas which when excited by an electromagnetic discharge power source, not shown, generates energy at optical wave lengths. Tube 12 is provided at the longitudinal ends thereof with windows 14 and 16 which are inclined reltaive the longitudinal axis of the tube at Brewster's angle so as to enhance transmission therethrough of certain desired frequencies. In axial alignment with windows 14 and 16 are optical reflector structures 18 and 20, respectively, which form an optical resonator and include reflective surfaces physically oriented so as to reflect optical energy back into plasma tube 12. In a well-known manner the reflected energy has a regenerative effect dependent upon the angular orientation of the reflective surfaces, which effect causes plasma tube 12 to oscillate or lase, whereupon useful laser energy is emitted through one or both of optical structures 18, 20.

Because of the criticality to stable resonant laser oscillation of the angular orientation of reflectors 18 and 20 relative the axis of plasma tube 12, the optical elements that form the optical resonator are mounted on a sturdy and massive structure. Such resonator structure includes rigid end plates 22 and 23 and, see FIGS. 2 and 4, a rigid hollow tube 24. In one laser designed according to the present invention tube 24 is formed of 5½ inch diameter aluminum tubing having a 5/16 inch wall thickness and end plates 22 are milled from thick aluminum plate. The reflectors are mounted to end plates 22 and 23 by means of adjustable mechanisms to permit accurate angular orientation of the reflectors relative to the axis of the plasma. Such adjustable mechanisms form no part of the present invention, and therefore, are not shown in detail.

Substantial amounts of heat energy are generated in driving plasma tube 12 into oscillation; a heat shield 26 is provided between plasma tube 12 and resonator support tube 24. The heat shield has the effect of avoiding creation of temperature gradients transnversely of support structure 24 thereby substantially eliminating differential thermal expansion thereacross and consequent misalignment of resonator elements 18 and 20. Heat shield 26 is carried on a base or casing 28 by means of extrusions 30, the base being rigidly mounted, for example on a footed pedestal 32. Pedestal 32 is provided with adjustable feet 34 to afford leveling and/or aiming of the longitudinal axis of plasma tube 12. The casing for the laser is completed by an upper cover member 36 and an intermediate heat shield 38, a space being provided therebetween to house plasma tube 12 and the electromagnetic discharge elements necessary for exciting the tube. The upper portion of the housing is supported on yieldable thermal insulators 40 so as to afford limited relative movement between the upper and lower portions of the casing and to support the upper portion of casing in spaced-apart relation to the lower portion of the casing to define a ventilating air gap 42.

Each pedestal 32 includes a mounting block 44, 44′ rigid therewith, which mounting blocks are also securely mounted at 46 to heat shield 26 adjacent opposite ends thereof. Resonator support structure 24 is apertured at 48 to admit mounting block 44 therethrough, see FIG. 2. In accordance with the present invention, resonator supporting structure 24 is joined to blocks 44 and 44′ at three, and only three, bearing connections 50, 52 and 54. With respect to bearing connection 50, see FIG. 2, a stub shaft 56 mounted rigid with block 44 extends normal to the block within the hollow interior of resonator support structure 24. Adjacent apertured portions 48 and rigid with the resonator support structure 24, a disc 58 is mounted for supporting centrally thereof the outer race 60 of a spherical bearing, the inner race 62 of which is slidably mounted on shaft 56. It will thus be seen that bearing 50 establishes a reactive force to the force of gravity acting on the weight of resonator support 24 and the elements supported thereby and reacts to other forces normal to shaft 56. The bearing structure, however, establishes no other reactive forces. That is to say, any twisting movement of block 44 away from a vertical plane due to differential expansion between heat shield 26 and casing wall 28 will not be transmitted to resonator support structure 24, because inner race 62 will rotate in outer race 60 with the onset of such movement. Similarly, any longitudinal movement of the casing arising from thermal expansion of the heat shield will not cause movement of resonator support structure 24 since inner race 62 is slidable along shaft 56. Bearing 50, as can be seen in FIG. 1, is mounted close to the right hand end of the structure so that it supports the weight of that end of structure 24.

Adjacent and inward of the opposite end of the laser, see FIG. 4, block 44′ has mounted rigid therewith a horizontally extending stub shaft 64 and a vertically extending stub shaft 66 which rigidly joins the block to pedestal 32. Shaft 64, which constitutes an element of bearing connection 52, is slidably received in the inner race 68 of a spherical bearing having outer race 70 rigidly mounted to resonator support structure 24 by a disc 72 carried interior of the resonator support structure. Thus it will be seen that bearing connection 52 supports the weight of the left hand end of elongate rigid resonator support structure 24 and also resists lateral movements of the resonator support normal to the axis of shaft 64. However, because inner race 68 is slidable along shaft 64 and because outer race 70, rigid with the resonator support 24, is spherically movable with respect to the inner race, bearing connection 52 permits free movement in all directions other than normal to the axis of shaft 64.

Consequently, any twisting movements arising from the existence of a temperature gradient across heat shield structure 26 will not affect the position of resonator supporting structure 24 or the alignment of reflectors 18 and 20.

Shaft 66, at the region thereof that extends through the side wall of resonator mounting structure 24, has slidably mounted thereon an inner race 74 of a spherical bearing having an outer race 76 rigidly mounted with respect to resonator support member 24. Thus, it will be seen that bearing connection 54 resists relative movement of resonator support member 24 and heat shield 28 in directions normal to the axis of shaft 66 but that such bearing connection permits relative movement in all other directions. Should heat shield 28 expand and contract in diameter during operation of the structure no forces will be transmitted to the resonator supporting member because inner race 74 is slidable along shaft 66. Any bending forces arising from the temperature gradients across the heat shield will not be transmitted to the resonator supporting member 24 because inner race 74 is spherically movable in outer race 76.

Bearing connections 50, 52 and 54 in addition to preventing transmission of thermally induced translational or twisting forces to resonator support member 24, prevent transmittal of any distortion inducing forces arising from uneven support of pedestal bases 32 on a horizontal surface. Moreover, shafts 56, 64 and 66 are preferably greater in length than the amount of expected thermal expansion thereby permitting installation of bearings 50, 52 and 54 without extremely close attention to manufacturing dimensional tolerances.

Additionally, it is desirable that the plasma tube be fixed to the stabilized reflector support in order to avoid undesirable strains in the plasma tube and also misalignment of the plasma tube axis relative to the optical axis of the resonator. This is accomplished in the illustrated embodiment by mounting the plasma tube 12 on heat-insulating blocks 77 which are fixedly attached to reflector support 24 through holes 78 which provide adequate clearance for movement of the plasma tube 12 relative to heat shields 28 and 38.

Another form of the present invention is shown in FIGS. 6–8 and includes a rigid optical resonator support structure 80 having an angular configuration defined by a horizontal leg 80a and a vertical leg 80b. Supported on opposite ends of resonator support structure 80 are reflective elements 82 and 84 which are mounted in axial alignment with the ends of a plasma tube 86 to reflect optical frequencies back into plasma tube to initiate and sustain laser oscillation. Surrounding resonator support structure 80 and spaced apart therefrom is a hollow heat shield 88 which is apertured at 90 to accommodate supporting brackets 92 which mount plasma tube 86 onto the horizontal leg 80a of the resonator support structure. The heat shield is supported in an outer housing 94 which is provided with depending pedestals 96 for supporting the structure on a horizontal surface. Within housing 94 are circuit elements, not shown, for exciting optical radiation in plasma tube 86.

Optical resonator support structure 80 is supported within heat shield 88 in accordance with the present invention by three bearing connections 98, 100 and 102. Bearing connections 100 and 102 are mounted adjacent opposite ends of the resonator support structure and are the functional counterparts of bearing connections 52 and 50 respectively, of the embodiment described hereinabove in reference to FIGS. 1–5. Because bearings 100 and 102 are substantially identical, only bearing 100 will be described in detail. Horizontal leg 80a has an excised portion 104 on the lower surface thereof for receiving the bearing. Split clamp blocks 106 and 108 are secured to resonator support structure 80 by screws 110 which are threadedly engaged with horizontal leg 80a adjacent excised portion 104. As shown in FIG. 8, split clamp blocks 106 and 108 are spaced apart from one another; a bearing shaft 112 is supported at its opposite ends by the clamp blocks and spans the distance between them. Centrally of shaft 112 an inner bearing race 114 is affixed to the shaft and defines a spherical bearing surface. An outer race bearing block 116 is fixedly mounted to heat shield 88 by screws 118 and is formed with a cylindric bore 120 which is sized for a running fit with respect to spherical inner race 114. A clearance of less than about .001 inch between the inside diameter of bore 120 and the outside diameter of spherical bearing race 114 affords a running fit.

Thus, bearing connection 100 prevents relative movement between optical resonator support structure 80 and heat shield 88 in directions normal to shaft 112 and permits relative movement in all other directions. Because cylindric bore 120 is slidable along inner spherical race 114, movement axially of shaft 112 is permitted, and because the spherical diameter of inner spherical race 114 is greater than that of shaft 112, a limited degree of pivotal or twisting movement between heat shield 88 and optical resonator support structure 80 is permitted. It will be noted that bearing connections 100 and 102 are mounted in general vertical alignment with vertical leg 80b, as a consequence of which such bearings support most of the weight of resonator support structure 80.

Bearing connection 98 is mounted in general transverse alignment with bearing connection 100 and completes the mounting of resonator support structure 80 within heat shield 88. Horizontal leg 80a is excised at 122 to afford space for the bearing connection. The bearing connection includes a shaft 124 which is threadably joined to optical support element 80 at 126 and is oriented on a generally horizontal axis perpendicular to the axis of shaft 112 of bearing connection 100. Shaft 124 includes a spherical inner bearing race 128 which is engaged for running fit in a cylindric bore 130 formed in an outer bearing block 132 that is rigidly mounted on heat shield 88 by screws 134. It will be seen that bearing connection 98 inhibits relative movement of resonator support structure 80 and heat shield 88 in directions normal to shaft 124 and permits relative movement in all other directions. Consequently, the optical support structure can expand axially of shaft 124 because inner spherical race 128 is slidable within bore 130; sliding rotary or twisting movement is afforded because shaft 124 has an outer diameter less than the inner diameter of bore 130 and the outer diameter of spherical bearing race 128. Accordingly, bearing connection 98 is the functional counterpart to bearing connection 54 in the embodiment described hereinabove in connection with FIGS. 1-5.

Thus it will be seen that the present invention provides a mounting structure for a laser resonator which assures that the reflective elements in the resonator will be maintained in constant alignment in the presence of thermally induced stresses inherent in the laser. The invention provides a resonator mounting structure which, although stably supported under static conditions, is isolated from kinematic forces arising from thermal and/or mechanical distortions. Moreover, the supporting structure is so adapted that fabrication of the laser can be effected without unduly close attention to manufacturing dimensional tolerances.

Although two embodiments of the invention have been shown and described, it will be obvious that other adaptations and modifications can be made without departing from the true spirit and scope of the invention.

What is claimed is:

1. In combination with a laser of the type having an elongate active medium and an optical element at each end of the active medium for reflecting energy back into the longitudinal ends of the active medium, a supporting structure for said optical elements comprising an elongate rigid member, means mounting said optical elements on said rigid member, a structure circumscribing said rigid member, and means for mounting said rigid member within said circumscribing structure, said last-named mounting means comprising first, second and third spaced apart bearing members forming the connections between said rigid member and said circumscribing structure, each said bearing member having an associated axis and being arranged to resist movement of said rigid member relative said circumscribing structure only in directions normal to the associated axis, said first and second bearing members being oriented with their associated axes generally parallel to the longitudinal axis of said rigid member, said third bearing member being oriented with its axis transversely of the longitudinal axis.

2. The invention of claim 1 wherein each said bearing member includes a shaft disposed coaxially of the associated axis, means joining each said axis rigidly to one of said rigid members and said circumscribing structure, and means including a spherical bearing slidably operatively associated with said shaft, said spherical bearing having an outer race rigid with the other of said rigid member and said circumscribing structure.

3. The invention of claim 1 wherein said first and second bearing members are disposed adjacent respective opposite longitudinal ends of said rigid member, said third bearing member being disposed generally transversely aligned with said first bearing.

4. The invention of claim 1 wherein said last-named mounting means includes first and second supporting pedestals attached to said circumscribing structure adjacent opposite ends thereof, first and second blocks mounted on respective said pedestals and extending interiorly of said circumscribing structure, said elongate rigid member having transversely aligned excised portions for affording clearance of said blocks therethrough, a shaft extending from each said block generally parallel to the longitudinal axis of said elongate rigid member, first and second bearings each having an inner race slidably mounted on a respective said shaft and an outer race spherically movable relative said inner race, means for rigidly mounting said outer races on said elongate rigid member, said third bearing member including a third shaft extending from said first block substantially transversely of said first shaft, a third bearing having an inner race slidably mounted on said third shaft and an outer race spherically movable relative said inner race, last said outer race being rigidly mounted to said elongate rigid member.

5. The invention of claim 1 wherein said bearing members each comprises means defining a spherical surface fixedly mounted on one of said elongate rigid member and said circumscribing structure, means defining a cylindric bore having an inner diameter sized for running fit on said spherical surface, said bore defining means being rigid with the other of said elongate rigid member and said circumscribing structure, said bore being disposed generally coaxially with the associated said axis.

6. The invention of claim 1 wherein said circumscribing structure includes a heat shield positioned between said active medium and said rigid member.

7. The invention of claim 1 including means for fixedly securing said active medium to said rigid member with the boundaries of said active medum beng permitted to move relative to said circumscribing structure.

References Cited

UNITED STATES PATENTS 3,400,596   9/1968   Laich _____ 331—94.5

JOHN KOMINSKI, *Primary Examiner.*